Aug. 16, 1949.  H. E. ELLIS  2,479,329

SINGLE-PHASE ELECTRIC MOTOR

Filed Feb. 21, 1947

WITNESSES:
E. A. M'Closkey.
Nw. C. Groome

INVENTOR
Harold E. Ellis.
BY
ATTORNEY

Patented Aug. 16, 1949

2,479,329

UNITED STATES PATENT OFFICE 2,479,329

SINGLE-PHASE ELECTRIC MOTOR

Harold E. Ellis, Cedarburg, Wis., assignor to Westinghouse Electric Corporation, East Pittsburgh, Pa., a corporation of Pennsylvania Application February 21, 1947, Serial No. 729,955

10 Claims. (Cl. 318—220)

The present invention relates to single-phase alternating-current electric motors and, more particularly, to a low-cost winding arrangement for single-phase motors.

Single-phase induction motors have a main, or running, primary winding and an auxiliary, or starting, primary winding, which are physically displaced from each other on the stator of the motor, and which carry currents that differ in time phase. Both the main and auxiliary windings are energized for starting the motor, and in some types of motors, such as the split-phase type, the auxiliary winding is deenergized when the motor has accelerated to a predetermined speed, usually by means of a speed-responsive switch. In the conventional design of motors of this type, both the main and auxiliary primary windings are distributed windings, each having a plurality of coils in each pole group of the winding distributed in a plurality of slots per pole. Thus, in a four-pole motor, for example, the main winding is usually wound in three or more slots per pole, and the auxiliary winding is usually wound in two or more slots per pole. It has been considered essential to use distributed windings for both the main and auxiliary windings in order to obtain smooth, quiet acceleration of the motor, since properly arranged distributed windings substantially eliminate any harmonics in the air-gap flux which might cause dips, cusps, or other irregularities in the speed-torque curve and thus adversely affect the starting performance.

The principal object of the present invention is to provide a winding arrangement for single-phase electric motors which is substantially lower in cost than the distributed windings which have been used heretofore, but which will give satisfactory starting performance.

A further object of the invention is to provide a single-phase induction motor having a concentrated main primary winding which can readily and quickly be wound by machine at a materially lower cost than the distributed windings which have been used heretofore.

A more specific object of the invention is to provide a single-phase induction motor having a concentrated main primary winding and a distributed auxiliary primary winding. A concentrated winding may produce relatively large harmonics in the air gap flux, which will cause objectionable dips or cusps in the speed-torque curve of the winding. In starting a single-phase motor, however, both the main and auxiliary windings are energized, so that it is the speed-torque curve which results from the combined effects of both windings that is important, rather than the speed-torque curve of either winding alone, at speeds below that at which the speed-responsive switch operates to deenergize the auxiliary winding. If a distributed starting winding is utilized, and arranged so that any harmonics it produces in the air-gap flux are of relatively small amplitude, the dips in the combined speed-torque curve are sufficiently small so that satisfactory starting performance is obtained in spite of the relatively large harmonics produced by the concentrated main winding. Thus, a low-cost concentrated main winding can be used with a distributed auxiliary winding, and the cost of the winding is materially reduced, without objectionably affecting the starting performance.

The invention will be more fully understood from the following detailed description, taken in connection with the accompanying drawing, in which.

Figure 1:
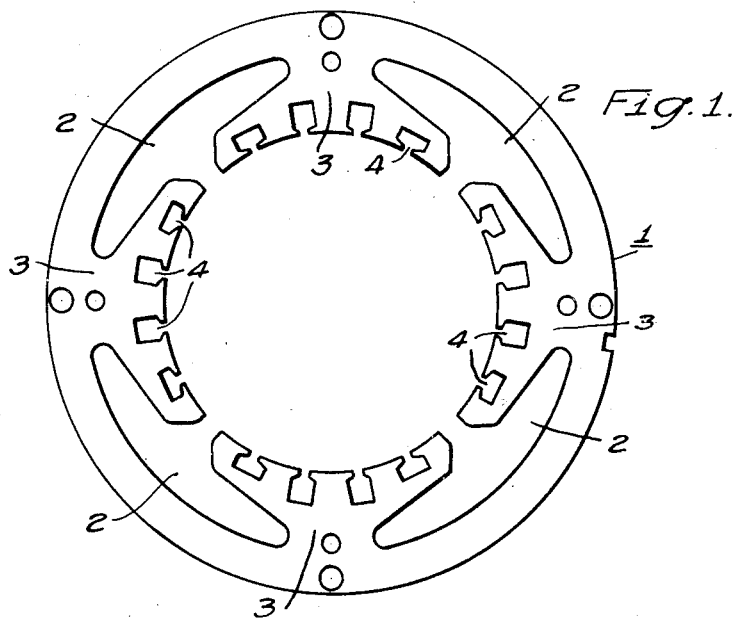
Figure 1 is a view of a stator punching or lamination for a motor embodying the invention.

The invention is shown in the drawing embodied in a four-pole motor of the split-phase type, although it will be understood that it is also applicable to motors having other numbers of poles, and to other types of single-phase motors. Figure 1 shows a single stator lamination or punching 1, showing the arrangement of the slots in which the primary windings are to be placed. Since a concentrated main primary winding is to be utilized, having a single concentrated coil in each pole of the winding, only one slot per pole is required for the main winding. Accordingly, the punching 1 of Fig. 1 has four relatively large slots 2 for reception of the coils of the main winding. The slots 2 extend over a considerable distance circumferentially of the punching, in order to accommodate the necessary number of turns in the main winding coils, and it will be observed that, in effect, they form four salient pole portions 3 on the inner periphery of the punching 1.

A distributed auxiliary winding is used, as explained above, and a plurality of smaller slots 4 are formed in the inner periphery of the punching 1 to receive the auxiliary winding. In the particular embodiment of the invention shown, four slots per pole, or a total of sixteen slots, are provided for the auxiliary winding. These slots are much smaller than the slots 2 for the main winding, since the auxiliary winding usually requires less winding space, and the slots 4 may be of different sizes, as indicated in Fig. 1, in order to obtain substantially uniform magnetic induction in the various parts of the salient pole portions 3.

Figure 2:
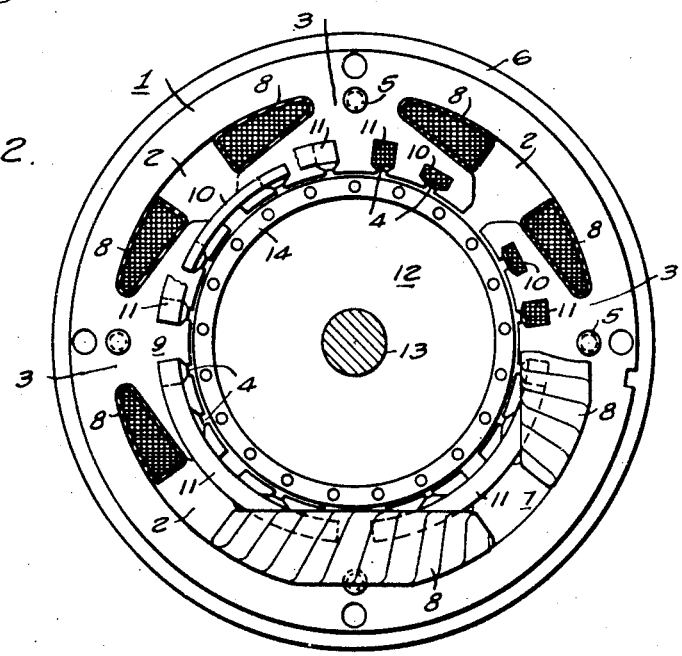
Fig. 2 is an end view of a motor embodying the invention, with the end bracket removed, and with the windings shown partly in section and partly broken away.

Fig. 2 shows an end view of a completely wound motor, with the end bracket omitted in order to show the arrangement of the windings. The stator laminations 1 are assembled in a stator core in the usual manner and held together by means of rivets 5, or in any other suitable manner, and the core is supported in a frame member 6. The main primary winding 7 is a four-pole, concentrated winding, each pole of the winding comprising a single, concentrated, multi-turn coil 8 encircling one of the salient pole portions 3, the coils 8 being wound around the pole portions 3 in the slots 2. The four coils 8 may be connected together in series with adjacent coils reversed in polarity, or they may be connected in any other desired manner to produce a four-pole magnetic field.

The distributed auxiliary primary winding 9 is placed in the slots 4 of the core, and in the embodiment shown, having four slots per pole, each pole group of the auxiliary winding comprises two concentric coils. One coil 10 of each pole group lies in the slots 4 nearest the tips of two adjacent pole portions 3, and the other wider coil 11 of the pole group lies in the immediately adjacent slots 4. Thus, each coil group of the auxiliary winding 9 spans the space between two adjacent pole portions 3, so that its center is displaced substantially ninety electrical degrees from the centers of the adjacent main winding coils 8. The concentric coils 10 and 11 of each coil group may be connected in series, and the four coil groups may be connected together in series or in any other desired or usual manner. The motor has a rotor member 12 of any suitable type, mounted on a shaft 13 and carrying a squirrel-cage secondary winding 14.

Figure 3:
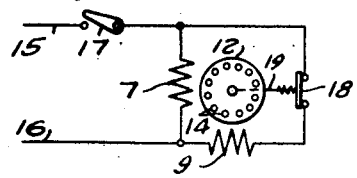
Fig. 3 is a schematic diagram showing the electrical connections of the motor.

The stator windings 7 and 9 are connected together and to the supply line in the usual manner, as shown in Fig. 3. Thus, the main winding 7 is connected directly across the single-phase line 15, 16 through a line switch 17. The auxiliary winding 9 is connected in parallel with the main winding 7 through a speed-responsive switch 18, which may be of the centrifugal type, and which is actuated by the rotor in response to the speed of the motor, as indicated by the dotted connection 19. The switch 18 is normally closed, and opens to disconnect the auxiliary winding 9 when the motor reaches a predetermined speed.

It should now be apparent that a relatively low-cost winding arrangement has been provided for single-phase motors. The concentrated coils 8 of the main winding 7 can easily and quickly be wound by machine, while the auxiliary winding 9 is preferably a skein winding, which can readily be inserted in the slots 4 by hand. This combination of concentrated machine-wound main winding and skein-type auxiliary winding results in very low cost of winding, but it will be understood that other types of auxiliary windings might also be used within the scope of the invention. In operation, the starting performance of the motor is entirely satisfactory. The concentrated main winding tends to produce harmonics of appreciable magnitude in the air-gap flux, but the effect of the distributed auxiliary winding is such that the speed-torque curve of the combined main and auxiliary windings does not have dips or cusps of objectionable magnitude, so that satisfactory starting performance is obtained.

A particular embodiment of the invention has been shown and described for the purpose of illustration, but it will be understood that various other embodiments and modifications are possible. Thus, one suitable arrangement of the auxiliary winding 9 has been shown, but other types of distributed auxiliary windings may also be used with satisfactory results, if they are designed so that their harmonics are kept to a small amplitude. The invention is, of course, applicable to motors of any number of poles, and while it has been described specifically with reference to a motor of the split-phase type, it may also be applied to other types of single-phase induction motors, such as the capacitor-start type, or the permanent-split capacitor type, for example. The invention is not limited to induction motors, however, but is applicable to any type of single-phase motor utilizing induction-motor action for starting, such as synchronous motors of the hysteresis and reluctance types. It is to be understood, therefore, that the invention is not limited to the specific details shown and described for the purpose of illustration, but in its broadest aspects, it includes all equivalent embodiments and modifications which come within the scope of the appended claims.

I claim as my invention:

1. A single-phase alternating-current induction motor having a main primary winding, each pole of said main primary winding being of substantially full pitch and comprising a single, concentrated coil, and said motor also having an auxiliary primary winding, said auxiliary primary winding being a distributed winding comprising a plurality of coils in each pole.

2. A single-phase alternating-current induction motor having a main primary winding, each pole of said main primary winding being of substantially full pitch and comprising a single, concentrated coil, and said motor also having an auxiliary primary winding, said auxiliary primary winding being a distributed winding comprising a plurality of coils in each pole, said main and auxiliary primary windings being displaced from each other by substantially ninety electrical degrees.

3. A single-phase alternating-current induction motor having a stator member and a rotor member, said stator member including a slotted stator core, a main primary winding and an auxiliary primary winding on said stator core, said main primary winding being a concentrated winding disposed in one slot per pole and providing substantially full pitch poles, and said auxiliary primary winding being a distributed winding disposed in a plurality of slots per pole.

4. A single-phase alternating-current induction motor having a stator member and a rotor member, said stator member including a slotted stator core, a main primary winding and an auxiliary primary winding on said stator core, said main primary winding being a concentrated winding disposed in one slot per pole and providing substantially full pitch poles, and said auxiliary primary winding being a distributed winding disposed in a plurality of slots per pole, said main and auxiliary primary windings being displaced from each other by substantially ninety electrical degrees.

5. A single-phase alternating-current induction motor having a stator member and a rotor member, said stator member including a laminated stator core, said stator core having a plurality of relatively large slots therein, the number of slots being equal to the number of poles, a concentrated main primary winding disposed in said slots, said stator core also having a plurality of smaller slots therein, the number of said smaller slots being greater than the number of poles, and a distributed auxiliary primary winding disposed in said smaller slots.

6. A single-phase alternating-current induction motor having a stator member and a rotor member, said stator member including a laminated stator core, said stator core having a plurality of relatively large slots therein, the number of slots being equal to the number of poles, a main primary winding disposed in said slots, each pole of said main primary winding comprising a single, concentrated coil, said stator core also having a plurality of smaller slots therein, the number of said smaller slots being greater than the number of poles, and an auxiliary primary winding disposed in said smaller slots, said auxiliary primary winding being a distributed winding comprising a plurality of coils in each pole.

7. A single-phase alternating-current induction motor having a stator member and a rotor member, said stator member including a laminated stator core, said stator core having a plurality of relatively large slots therein, the number of slots being equal to the number of poles, a main primary winding disposed in said slots, each pole of said main primary winding comprising a single, concentrated coil, said stator core also having a plurality of smaller slots therein, the number of said smaller slots being greater than the number of poles, and an auxiliary primary winding disposed in said smaller slots, said auxiliary primary winding being a distributed winding comprising a plurality of coils in each pole, said main and auxiliary primary windings being displaced from each other by substantially ninety electrical degrees.

8. A single-phase alternating-current induction motor having a stator member and a rotor member, said stator member including a laminated stator core, said stator core having a plurality of relatively large slots therein forming, in effect, a plurality of salient pole pieces, a coil disposed on each of said pole pieces, said coils being connected together to form a concentrated main primary winding, said stator core also having a plurality of smaller slots therein in the spaces between the large slots, and a distributed auxiliary primary winding disposed in said smaller slots.

9. A single-phase alternating-current induction motor having a stator member and a rotor member, said stator member including a laminated stator core, said stator core having a plurality of relatively large slots therein forming, in effect, a plurality of salient pole pieces, a coil disposed on each of said pole pieces, said coils being connected together to form a concentrated main primary winding, said stator core also having a plurality of smaller slots therein in the spaces between the large slots, the number of small slots being greater than the number of large slots, and a distributed auxiliary primary winding having a plurality of coils per pole disposed in said small slots.

10. A single-phase alternating-current induction motor having a stator member and a rotor member, said stator member including a laminated stator core, said stator core having a plurality of relatively large slots therein forming, in effect, a plurality of salient pole pieces, a coil disposed on each of said pole pieces, said coils being connected together to form a concentrated main primary winding, said stator core also having a plurality of smaller slots therein in the spaces between the large slots, the number of small slots being greater than the number of large slots, and a distributed auxiliary primary winding having a plurality of coils per pole disposed in said small slots, said main and auxiliary primary windings being arranged so that their poles are displaced from each other by substantially ninety electrical degrees.

HAROLD E. ELLIS.

REFERENCES CITED

The following references are of record in the file of this patent:

UNITED STATES PATENTS

| Number | Name | Date |
|---|---|---|
| 923,754 | Alexanderson | June 1, 1909 |
| 2,124,427 | Morrill et al. | July 19, 1938 |